United States Patent [19]
Bishop

[11] Patent Number: 5,975,332
[45] Date of Patent: Nov. 2, 1999

[54] COMPACT SPILL CONTAINMENT PAN

[75] Inventor: Merrill E. Bishop, Crystal Lake, Ill.

[73] Assignee: Trans Environmental Systems, Inc., Bay Village, Ohio

[21] Appl. No.: 08/727,964

[22] Filed: Oct. 9, 1996

[51] Int. Cl.⁶ .................................................. B65D 39/00
[52] U.S. Cl. ........................ 220/571; 220/573; 184/106; 137/312
[58] Field of Search .................................. 220/571, 343, 220/573; 184/1.5, 106; 141/267, 391; 137/312

[56] References Cited

U.S. PATENT DOCUMENTS

| | | | |
|---|---|---|---|
| 3,920,144 | 11/1975 | Callen | 220/571 |
| 4,161,261 | 7/1979 | Frater | 220/343 |
| 4,823,947 | 4/1989 | Maynard, Jr. | 220/573 |
| 5,330,069 | 7/1994 | Jamison et al. | 220/343 |

FOREIGN PATENT DOCUMENTS

| 5817 | 8/1909 | United Kingdom | 220/571 |
|---|---|---|---|

*Primary Examiner*—Joseph M. Moy
*Attorney, Agent, or Firm*—Rankin, Hill, Porter & Clark LLP

[57] ABSTRACT

Spill containment apparatus especially adapted for use at a railroad siding to catch inadvertent chemical spills includes a shallow, rectangular pan having upstanding, opposed sidewalls and upstanding, opposed endwalls. Flaps are pivotally connected to the sidewalls near the upper edges thereof. The flaps can be moved from a first position where they are stored inside the pan to a second position where they extend laterally outside the pan and over the railroad tracks. A longitudinally movable cover is provided for the pan, the cover being mounted on tracks for back and forth movement between a first position where the pan is covered to a second position where the pan is exposed. In the second position of the cover, the flaps are permitted to move between their first and second positions. Because the flaps can be stored inside the pan, the size of the pan when not in service is relatively small. Because the flaps can be extended in use, the effective surface area protected by the pan is quite large.

17 Claims, 8 Drawing Sheets

COMPACT SPILL CONTAINMENT PAN

BACKGROUND OF THE INVENTION

1. Field of the Invention

The invention relates to spill containment techniques for preventing the undesirable discharge of chemical materials onto the ground and, more particularly, to a compact spill containment pan that is disposed at a railroad siding so as to collect any inadvertent spills that may occur during a railroad tank car loading or unloading operation.

2. Description of the Prior Art

Traditionally, railroad tank car loading and unloading has been relatively unregulated. In the past, railroad sidings reflected that lack of concern because they had no provision to collect accidental discharges of whatever was being loaded and unloaded. Often the commodity being shipped was inexpensive or perceived to be of little environmental impact, and therefore any spills were either hosed down or just left for the next rain to clear away. With the advent of stiff fines and high soil remediation costs, techniques to prevent spills or eliminate adverse environmental consequences have become important.

Since spills most often occur during a loading or unloading operation, well-designed spill containment pans can be used to collect and possibly economically reuse spilled chemicals. Some spill containment pans actually are only diversion aprons that require the construction of some type of collection sump. These sumps are subject to crack failure or to filling with dirt and water. Since spill containment pans are exposed to rainwater, snow, and blowing dirt and debris, their effectiveness as spill containment devices is questionable. Environmental regulations provide that any rainwater collected in these spill containment pans is considered to be contaminated and must be handled with the same concern (and at the same cost) as hazardous waste.

Prior efforts to collect leaking, dripping and spilled materials, particularly oily materials, have included providing a flexible plastic drop cloth or sheet which forms a barrier to prevent contact of the chemical material with the ground. The plastic sheet can be either suspended or mounted to the underside of a transport vehicle, as in U.S. Pat. No. 4,936,418, or it can be provided with inflatable or raised edge structures to funnel fluids to a sump or collecting area as described in U.S. Pat. No. 5,099,872. The barrier sheet type containment arrangements generally do not include any means for preventing unwanted ingress of rain, snow, dirt, dust or other environmental contaminants.

Spill pans with convertible lidded structures are known in the art as taught in U.S. Pat. Nos. 5,052,422 and 4,651,887. The latter patent is designed for use between the rails of a railroad siding. The spill pan described in the '887 patent is generally effective for containing spills and drips that fall directly downwardly between the rails. The spill pan in question requires direct overhead placement of the tank car and its discharge opening in order to be in proper position for use. Moreover, the containment apparatus described in the '887 patent does not provide any means for catching and collecting spills occurring outside the rails instead of between them.

An improved spill containment apparatus is disclosed in U.S. Pat. No. 5,435,458, issued Jul. 25, 1995 to Merrill E. Bishop, the disclosure of which is incorporated herein by reference (referred to herein as "the Multi-Pan Patent"). In the Multi-Pan Patent, three separate spill containment pans are disclosed—a center pan disposed between the rails and outboard pans disposed outside each of the rails. The pans have movable covers that prevent dirt or rainwater from entering the pans when the covers are in the closed position. When the covers for the outboard pans are opened, the covers provide additional spill collection surfaces. The cover for the center pan slides longitudinally of the railroad tracks, on special rails, to cover or uncover the center containment pan.

While the apparatus disclosed in the Multi-Pan Patent has proven to be very effective in practice, it employs three pans that are disposed in a fixed location relative to a railroad siding. The pans occupy a considerable amount of ground area in order to carry out their intended function of collecting inadvertent spills. Because the spill containment pans disclosed in the Multi-Pan Patent are well-built, they necessarily are somewhat expensive to manufacture. It is possible that the expense of the pans may serve as an impediment to their widespread purchase and implementation.

Desirably, a spill containment apparatus for use with railroad tank cars would be relatively compact and inexpensive. Any such spill containment apparatus hopefully would be able to be reconfigured on site to protect an adequate spill-collection area beneath a railroad tank car.

SUMMARY OF THE INVENTION

In response to the forgoing and other concerns, the present invention provides a new and improved compact spill containment pan especially adapted for use with railroad tank cars. The spill containment pan according to the present invention has a reservoir portion adapted to be disposed centrally between the rails of a railroad siding. The pan is adapted to be permanently disposed between the rails at the siding.

In order to prevent the undesired ingress of water, dirt, or other environmental contaminants during periods of non-use, the invention includes a cover. The cover is movable from a first position in which the reservoir is covered to a second position in which the reservoir is exposed. In the preferred embodiment, the cover is mounted on guide rails that are disposed parallel to the railroad rails for sliding movement of the cover parallel to the railroad rails.

The invention includes flaps that are hingedly connected to the pan along the upper, side edges of the pan. The flaps can be folded toward each other when the pan is not in use. In the folded or closed position, the flaps are enclosed by the cover. In the unfolded or open position, the flaps extend over the railroad rails and outwardly beyond the rails beneath the sides of the tank car to be loaded or unloaded. The flaps will catch most inadvertent spills and direct the spills into the reservoir.

The spill containment pan according to the invention provides many of the advantages of prior art spill containment pans while having the additional advantages of being compact and less expensive. While the flaps do not extend as far outboard as the flaps used with the outboard pans disclosed in the Multi-Pan Patent, nevertheless the pan according to the present invention is effective for most applications, particularly bottom-unloading operations.

The foregoing and other features and advantages of the invention will be apparent from the description and claims that follow, taken in conjunction with the accompanying drawings.

DESCRIPTION OF THE PREFERRED EMBODIMENT

Figure 1:
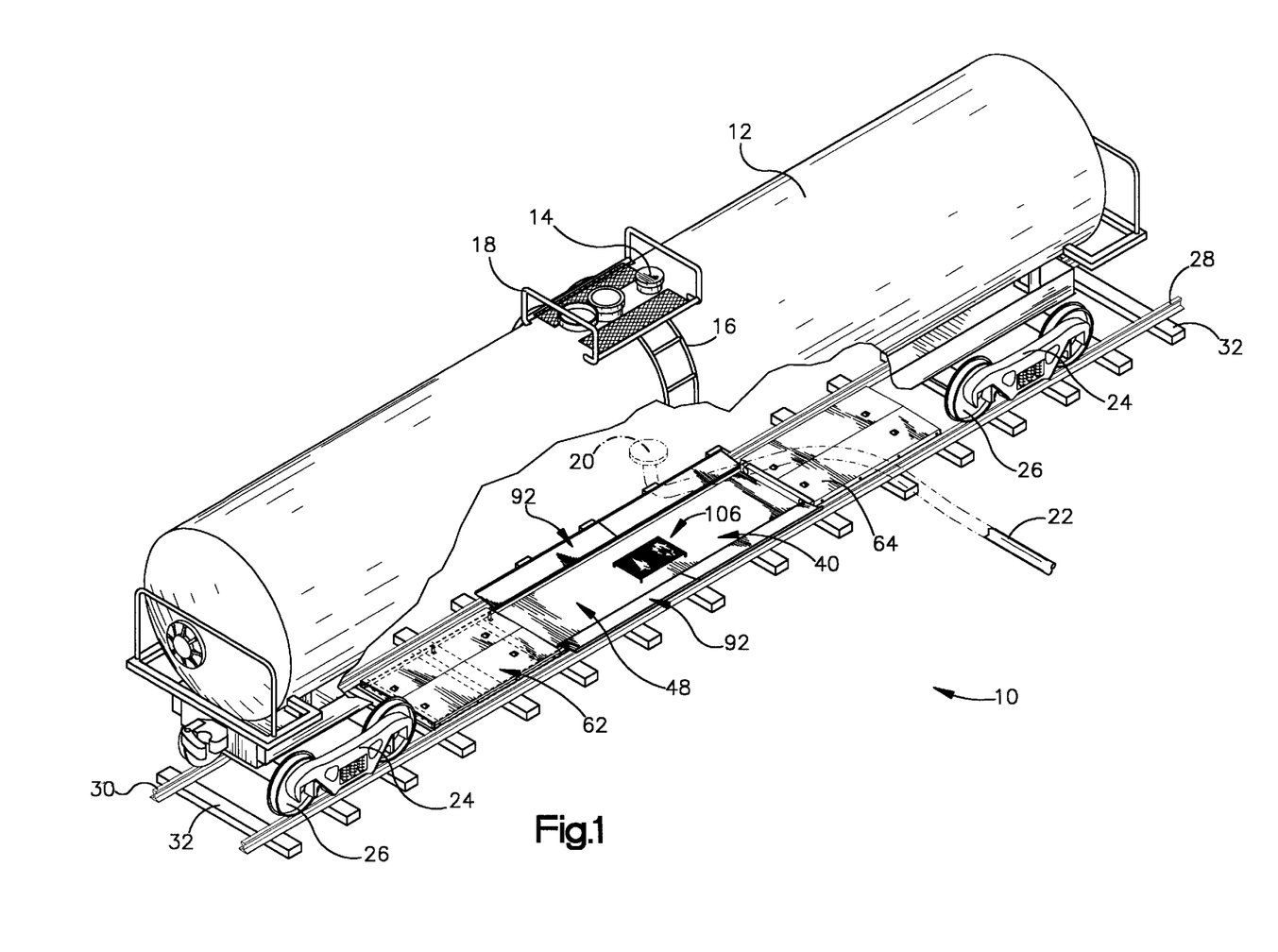
FIG. 1 is a perspective view of a railroad siding showing a railroad tank car positioned above a spill containment pan according to the present invention.

Referring to FIG. 1, a railroad transfer station, or siding, is indicated by the reference numeral 10. At the siding 10, chemical materials are loaded into, or unloaded from, a railroad tank car 12. As used herein, the term "railroad tank car" is intended to encompass any railed vehicle that can be loaded or unloaded at a railroad siding. The car 12 includes a top opening 14 through which chemicals can be loaded into the car 12. The top opening 14 is accessible by way of permanently mounted ladders 16 that are connected to a superstructure 18. The car 12 includes a bottom opening 20 through which chemicals can be unloaded from the car 12 through a hose 22. As is conventional, the car 12 includes trucks 24 having wheels 26. The wheels 26 ride upon parallel rails 28, 30 which are secured to ties 32.

Referring now to FIGS. 1–9, spill containment apparatus according to the invention is indicated generally by the reference numeral 40. The apparatus 40 is in the form of a pan that has a bottom wall 42, opposed sidewalls 44, and opposed endwalls 46. Together, the bottom wall 42, the sidewalls 44, and the endwalls 46 define a reservoir 48. The upper periphery of the sidewalls 44 and the endwalls 46 defines a top opening 50 through which inadvertently spilled chemicals can be directed into the reservoir 48.

As will be apparent from an examination of the Figures, the pan 40 is rectangular such that it will fit between the rails 28,30 of the siding 10. The bottom wall 42 rests atop the ties 32. The pan 40 includes four L-shaped brackets 52 that are secured to the endwalls 46 and which project outwardly therefrom. The brackets 52 are secured to the ties 32 by means of lag bolts, spikes, or other suitable fasteners. By securing the brackets 52 to the ties 32, the pan 40 is fixed in place between the rails 28, 30. Each of the brackets 52 includes a hook-like rib 54 that is adapted to receive the loops of a bridle (not shown). By connecting the bridle to a backhoe or other crane-type device, the pan 40 can be installed conveniently. The brackets 52 also include openings (not shown) to enable one or more grounding cables to be connected to the pan 40.

The pan 40 includes four NPT half-couplings 56 that project from the endwalls 46. The half-couplings 56 are closed by removable NPT plugs 58. Upon removal of the plugs 58 and connection of the half couplings 56 to suitable piping (not shown), the reservoir 48 can be drained or pumped of its contents.

Figure 2:
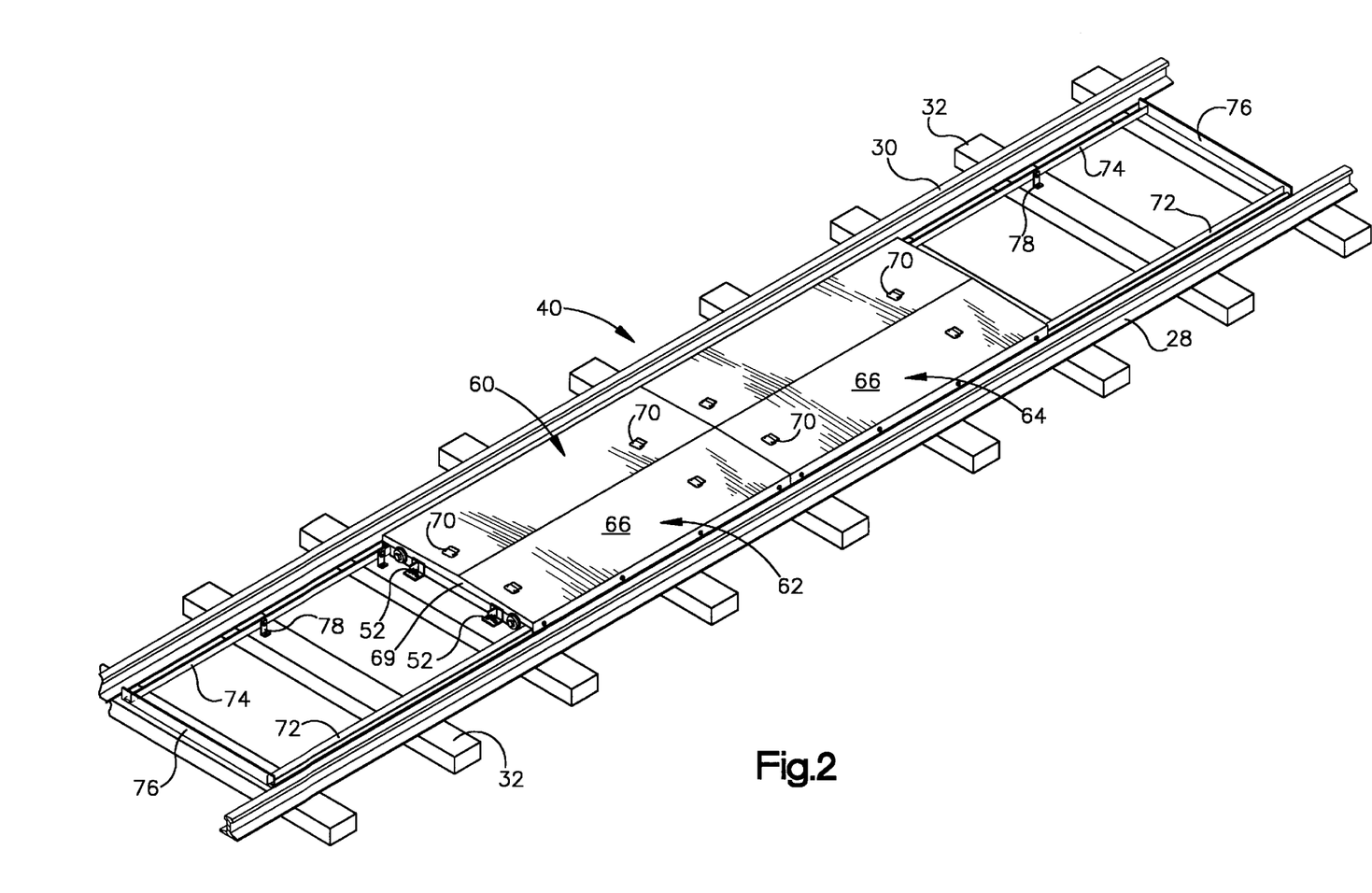
FIG. 2 is a view similar to FIG. 1 with the railroad tank car removed and a cover and spill-collecting flaps in a closed position.
Figure 3:
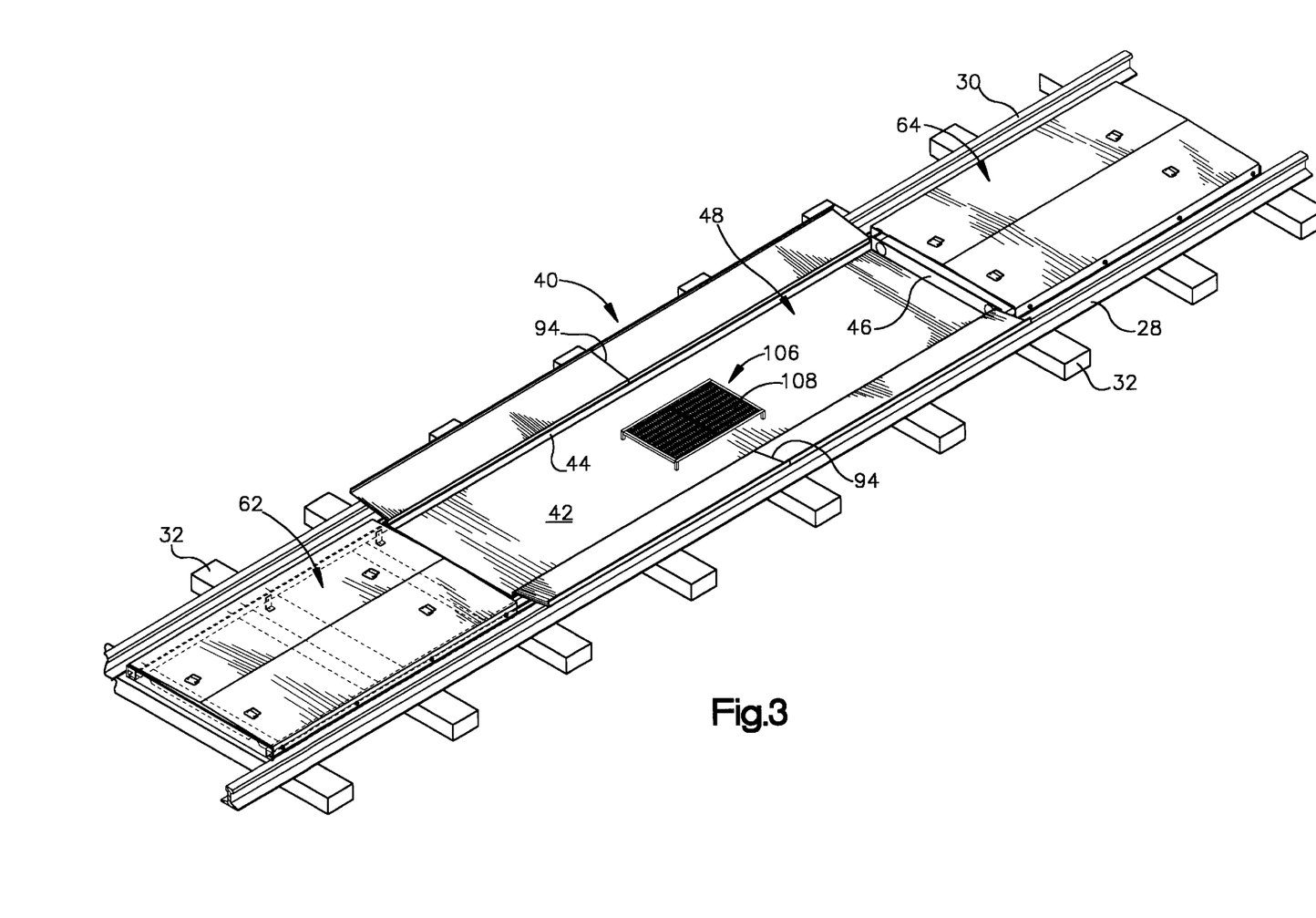
FIG. 3 is a view similar to FIG. 2 with the cover and flaps in an open position.
Figure 4:
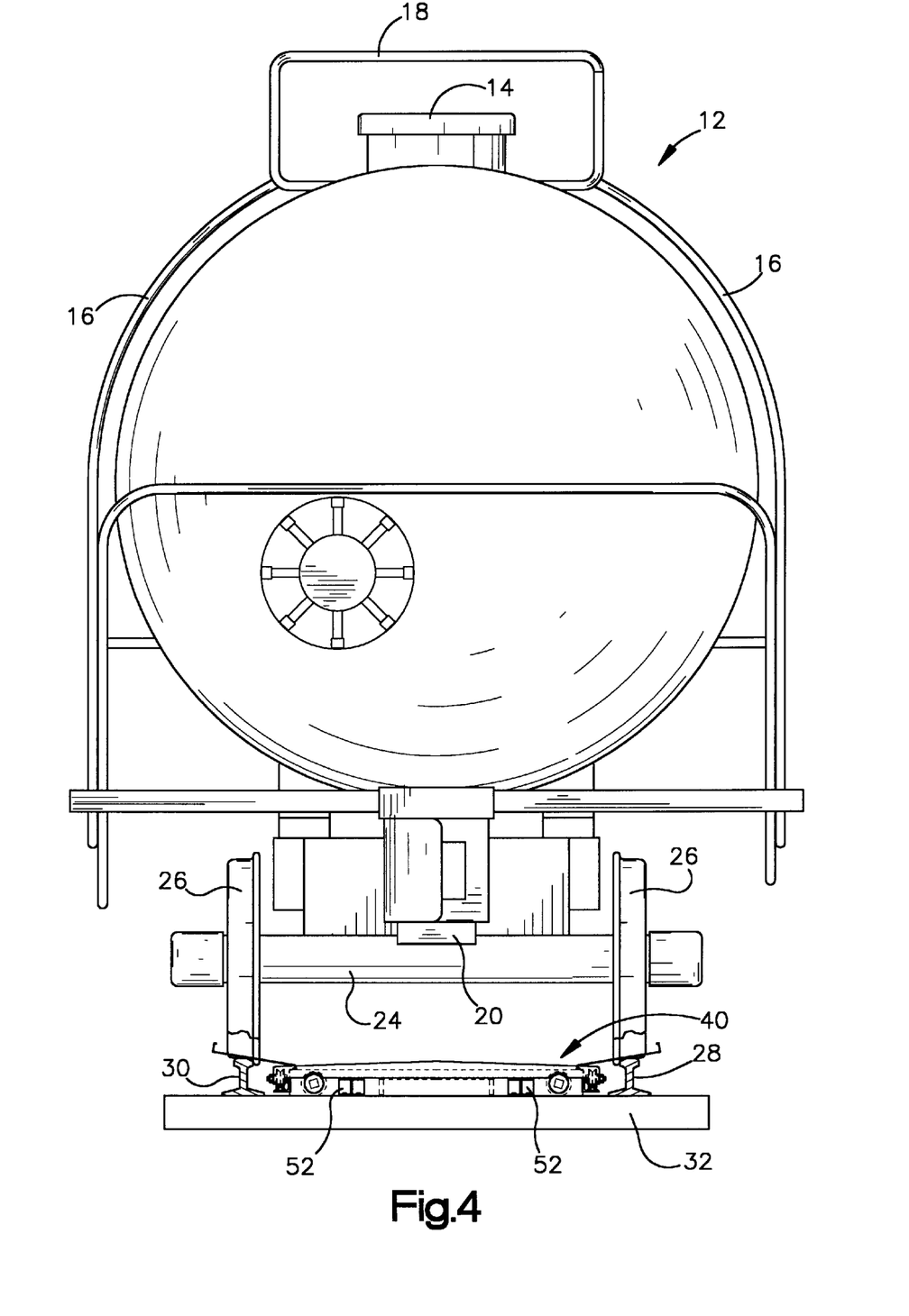
FIG. 4 is an end elevational view of the railroad tank car and spill containment pan of FIG. 1.

The pan 40 includes a cover 60. The cover 60 has first and second sections 62, 64 that are disposed adjacent to each other in the closed position (FIG. 2). One of the sections 62, 64 overlaps the other to provide a sealing function. The sections 62, 64 are movable away from each other parallel to the rails 28, 30 to expose the reservoir 48 (FIG. 3). The sections 62, 64 each include a peaked roof 66 with depending sidewalls 68 and an endwall 69. The sections 62, 64 are provided with a plurality of handles 70 for purposes of moving the sections 62, 64 between the open and closed positions. Because the roof 66 is highest at its center (FIGS. 5 and 6), rainwater or melting snow will be diverted to the sides of the pan 40. In a typical embodiment with a pan 40 that is 10 feet long, the sections 62, 64 are about 64 inches long. The sections 62, 64 are made of diamond plate steel with the pattern on the outside.

The cover 60 is movable on tracks 72, 74. The tracks 72, 74 are bolted to the pan 40 adjacent the intersection of the sidewalls 44 and the endwalls 46. The tracks 72, 74 are disposed parallel to the rails 28, 30. A laterally extending spacer 76 connects the ends of the tracks 72, 74 farthest from the pan 40. The tracks 72, 74 and the bar 76 are connected to the ties 32 and held in position above the ties 32 by means of brackets 78. The tracks 74 includes guides 80 that extend the length of the tracks 74. The guides 80 are in the form of an upside-down V-shape. The guides 80 preferably are made from readily available angle iron.

The cover 60 is supported for back and forth movement by a plurality of wheels 82 having circumferential grooves 84. The grooves 84 engage the guides 80 to keep the cover 60 in a fixed, desired lateral position relative to one of the sidewalls 44. The wheels 82 adjacent the other sidewall 44 are permitted to move laterally relative to the sidewall 44 as may be required. The wheels 82 are mounted to the sidewalls 68 by means of shoulder bolts 86, spacers 88, and nuts 90. If desired, the shoulder bolts 86 could be replaced by conventional bolts and a jam nut (to provide proper spacing for the wheels 82 from the sidewalls 68).

Figure 5:
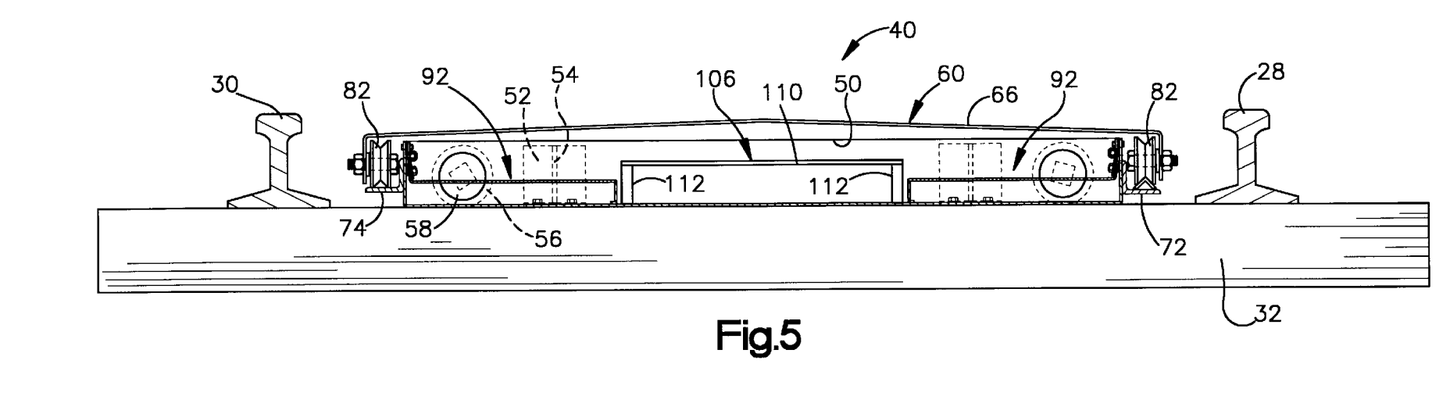
FIG. 5 is a cross-sectional view of the spill containment pan of FIG. 1 with the cover and flaps in a closed position.
Figure 6:
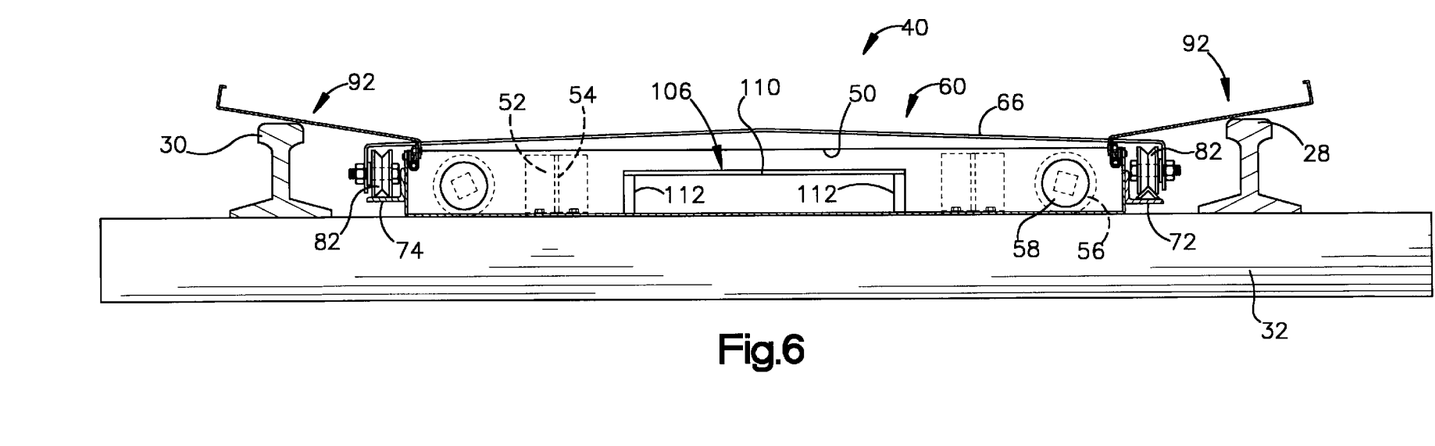
FIG. 6 is a cross-sectional view similar to FIG. 5 with the cover and flaps in an open position.
Figure 7:
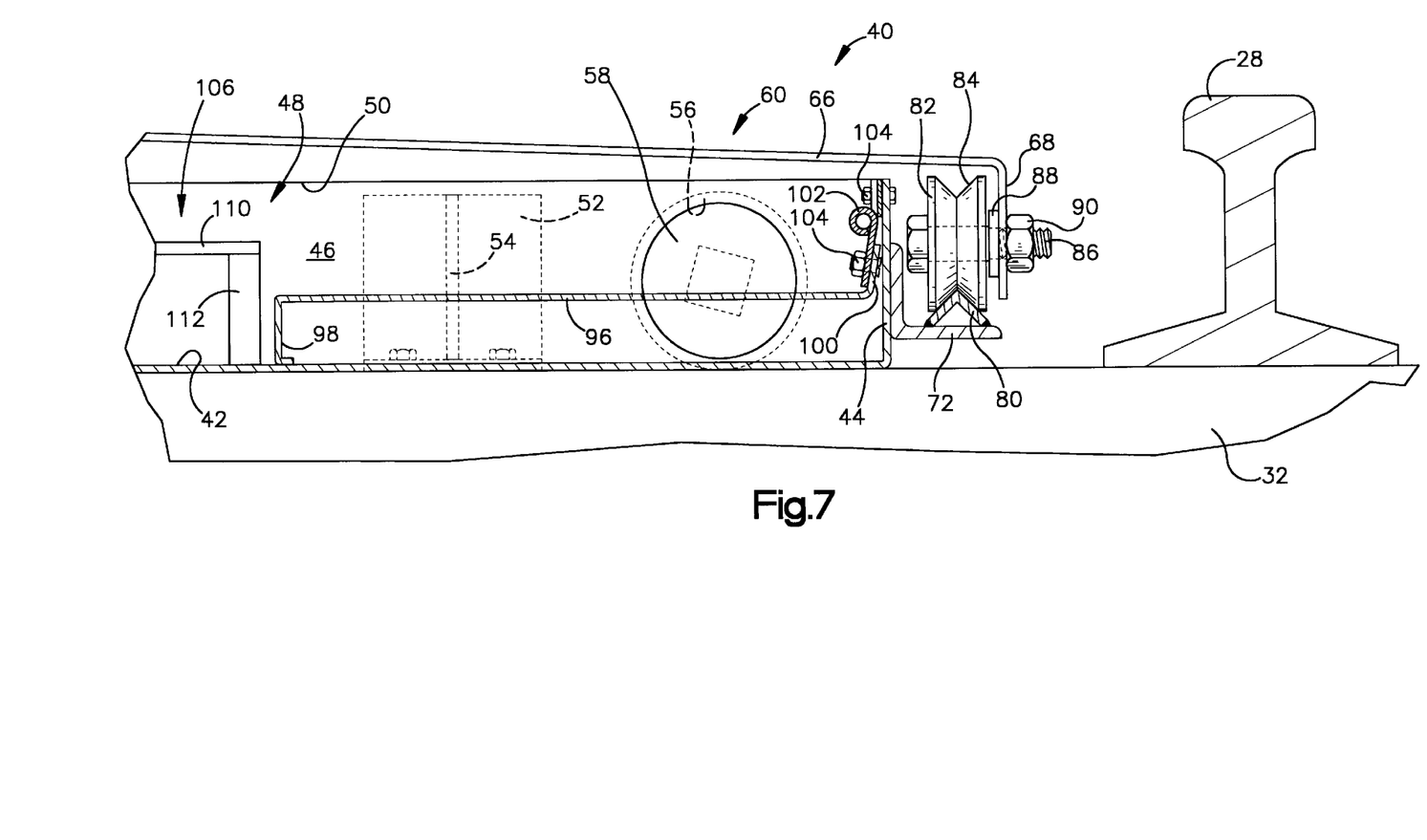
FIG. 7 is an enlarged cross-sectional view of one side of the spill containment pan of FIG. 1 showing the manner in which the cover and flaps are mounted for movement between the open and closed positions.
Figure 8:
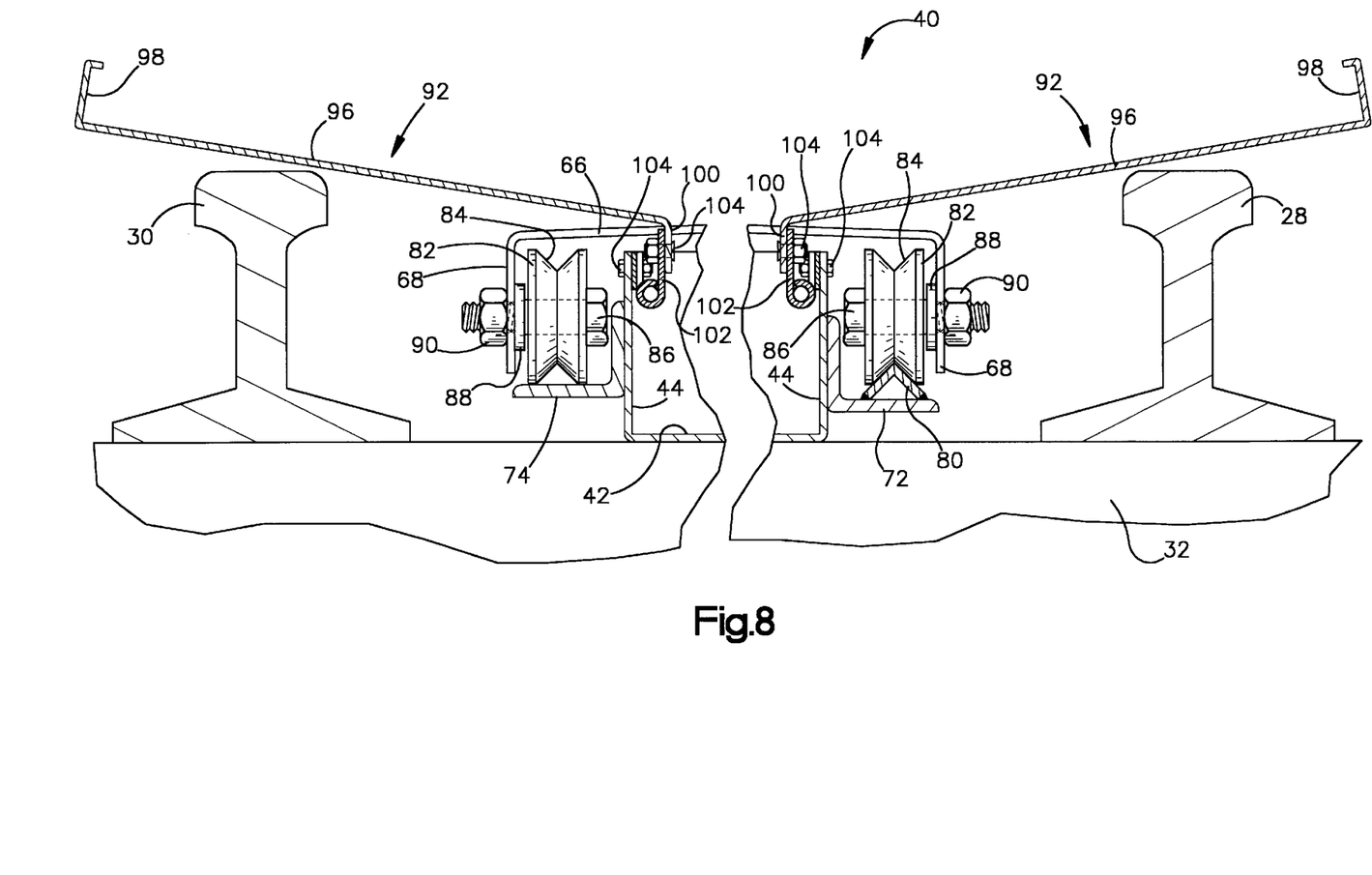
FIG. 8 is an enlarged cross-sectional view similar to FIG. 7 showing the cover and flaps in the open position.
Figure 9:
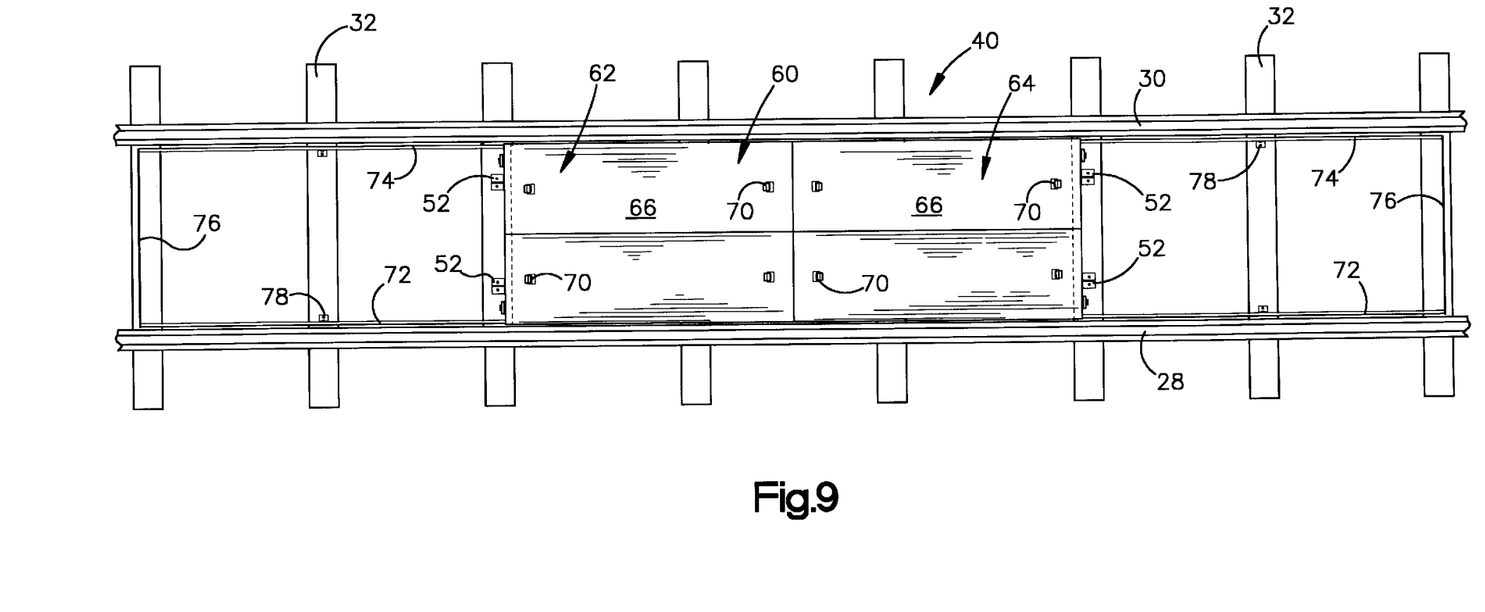
FIG. 9 is a top plan view of the spill containment pan of FIG. 1.

The pan 40 includes a plurality of flaps 92 that are movable from a stowed, or closed position (FIGS. 5 and 7) to an extended, or open position (FIGS. 6 and 8). The flaps 92 include an overlapping portion 94 at their ends to provide a continuous surface in the open position for directing any spills into the reservoir 48. The flaps 92 include a flat center portion 96, a reversely bent end portion 98, and a tab portion 100. Hinges 102 are connected to the tab portions 100 and the upper periphery of the sidewalls 44 by means of bolts 104. Referring particularly to FIGS. 5 and 7, the center portions 96 are horizontal and the reversely bent portions 98 rest on the bottom wall 42 when the flaps 92 are in the closed position. As shown in FIGS. 6 and 8, the center portions 96 are disposed at an angle of about 10–15 degrees to the horizontal when the flaps 92 are in the open position. The vertical location of the hinges 102 on the sidewalls 44 and the angle between the center portions 96 and the tab portions 100 are selected to accomplish the foregoing objectives, as well as to provide clearance between the flaps 92 and the rails 28, 30 when the flaps 92 are in the open position.

The pan 40 includes a movable platform 106 for workers to kneel on while connecting or disconnecting the hose 22 from the underside of the tank car 12. The platform 106 is made from a sheet of expanded metal 108 that is supported by a rectangular frame 110 and vertically extending legs 112. The width of the platform 106 is such that the flaps 92 can close completely for storage inside the reservoir 48. Typically the endwalls 46 are about 44 inches wide, the flaps 92 are about 12 inches long, and the platform 106 is about 16 inches wide.

In use, the flaps 92 and the cover 60 are closed, and a railroad tank car 12 is positioned above the pan 40 at the siding 10. The sections 62, 64 are opened to that position shown in FIGS. 1 and 3, and then the flaps 92 are opened. The hose 22 is connected to the bottom opening 20 and the unloading operation then is conducted. Any inadvertent spills will fall directly into the reservoir 48 or will be collected by the flaps 92 and directed into the reservoir 48. After the unloading operation has been completed, the foregoing steps can be reversed in order to permit the tank car 12 to be moved from the siding 10.

As will be apparent from the foregoing description, the spill containment pan according to the invention provides a number of advantages. It is relatively inexpensive because it is constructed largely from readily available materials such as 3/16-inch sheet steel and 3/16-inch or 1/4-inch angle iron. The pan 40 is compact because the flaps 92 are stored within the reservoir 48. Due to the configuration of the brackets 52, the pan 40 can be moved readily by a backhoe for installation. The half-couplings 56 enable the reservoir 48 to be emptied without difficulty by being pipe-connected to an auxiliary higher-volume containment vessel if deemed necessary by regulatory demands.

Although the invention has been described in its preferred form with a certain degree of particularity, it will be understood that the present disclosure of the preferred embodiment has been only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. Spill containment apparatus for use at a railroad siding where a railroad tank car is being loaded or unloaded, the spill containment apparatus being disposed beneath the tank car between the rails of the railroad siding, comprising:
   a pan having a bottom wall, upstanding opposed sidewalls, and upstanding opposed endwalls defining a reservoir having a top opening;
   a cover for the reservoir, the cover being movable from a first position where the top opening is closed to a second position where the top opening is open; and
   first and second flaps connected to the sidewalls, the first and second flaps being movable from a first, inwardly folded position where they are disposed within the boundaries defined by the sidewalls and the endwalls, and a second, outwardly extending position where they catch inadvertent spills and divert the spills into the reservoir.

2. The apparatus of claim 1, wherein the first and second flaps are pivotally connected to the sidewalls adjacent the upper edges thereof.

3. The apparatus of claim 1, wherein the flaps in the second position extend over the railroad rails.

4. The apparatus of claim 1, wherein the flaps include a reversely bent end portion that engages the bottom wall when the flaps are in the first position.

5. The apparatus of claim 1, wherein the flaps in the second position are angled upwardly from the sidewalls at an angle of approximately 10–15 degrees to the horizontal.

6. The apparatus of claim 1, wherein the first and second flaps include adjacent sections that are movable independently of each other and which include overlapping portions that establish a continuous surface in the second position.

7. The apparatus of claim 1, wherein the cover is mounted on guide rails disposed parallel to the railroad rails, and the cover is moved along the guide rails when it is moved between the first and second positions.

8. The apparatus of claim 7, wherein the cover includes first and second adjacent sections that are movable independently of each other parallel to the railroad rails, the first section being disposed at one end of the reservoir and the second section being disposed at the other end of the reservoir, the first and second sections moving away from each other when they are being moved to the open position, and moving toward each other when they are being moved to the closed position.

9. The apparatus of claim 1, wherein the cover defines a non-horizontal surface that directs rainwater off of the cover.

10. The apparatus of claim 9, wherein the cover is peaked at the center and slopes downwardly toward the sidewalls.

11. Spill containment apparatus for use at a railroad siding where a railroad tank car is being loaded or unloaded, the spill containment apparatus being disposed beneath the tank car between the rails of the railroad siding, comprising:
    a pan having a bottom wall, upstanding opposed sidewalls, and upstanding opposed endwalls defining a reservoir having a top opening;
    a cover for the reservoir, the cover defining a non-horizontal surface that directs rainwater off of the cover, the cover being movable from a first position where the top opening is closed to a second position where the top opening is exposed, the cover being mounted on guide rails disposed parallel to the railroad rails and movable along the guide rails when the cover is being moved between the first and second positions; and
    first and second flaps pivotally connected to the sidewalls adjacent the upper edges thereof, the first and second flaps being movable from a first, inwardly folded position where they are disposed within the boundaries defined by the sidewalls and the endwalls, and a second, outwardly extending position where they extend over the railroad rails to catch inadvertent spills and divert the spills into the reservoir.

12. The apparatus of claim 11, wherein the flaps include a reversely bent end portion that engages the bottom wall when the flaps are in the first position.

13. The apparatus of claim 11, wherein the flaps in the second position are angled upwardly from the sidewalls at an angle of approximately 10–15 degrees to the horizontal.

14. The apparatus of claim 11, wherein the first and second flaps include adjacent sections that are movable independently of each other and which include overlapping portions that establish a continuous surface in the second position.

15. The apparatus of claim 11, wherein the cover includes first and second adjacent sections that are movable independently of each other parallel to the railroad rails, the first section being disposed at one end of the reservoir and the second section being disposed at the other end of the reservoir, the first and second sections moving away from each other when they are being moved to the open position, and moving toward each other when they are being moved to the closed position.

16. The apparatus of claim 11, wherein the cover is peaked at the center and slopes downwardly toward the sides.

17. Spill containment apparatus for use at a railroad siding where a railroad tank car is being loaded or unloaded, the spill containment apparatus being disposed beneath the tank car between the rails of the railroad siding, comprising:
    a pan having a bottom wall, upstanding opposed sidewalls, and upstanding opposed endwalls that define a reservoir having a top opening;

a cover for the reservoir, the cover having a non-horizontal surface that is peaked at the center and which slopes downwardly toward the sidewalls, the cover being movable from a first position where the top opening is closed to a second position where the top opening is exposed, the cover being mounted on guide rails disposed parallel to the railroad rails and movable along the guide rails when the cover is being moved between the first and second positions, the cover including first and second adjacent sections that are movable independently of each other parallel to the railroad rails, the first section being disposed at one end of the reservoir and the second section being disposed at the other end of the reservoir, the first and second sections moving away from each other when they are being moved to the open position, and moving toward each other when they are being moved to the closed position; and first and second flaps pivotally connected to the sidewalls adjacent the upper edges thereof, the first and second flaps being movable from a first, inwardly folded position where they are disposed within the boundaries defined by the sidewalls and the endwalls, and a second, outwardly extending position where they extend over the railroad rails to catch inadvertent spills and divert the spills into the reservoir, the flaps extending upwardly from the sidewalls at an angle of approximately 10–15 degrees to the horizontal, the flaps including adjacent sections that are movable independently of each other and which include overlapping portions that establish a continuous surface in the second position.

* * * * *